(12) United States Patent
Sibbach et al.

(10) Patent No.: US 12,196,107 B2
(45) Date of Patent: Jan. 14, 2025

(54) TURBINE ENGINE WITH A BLADE HAVING WOVEN CORE AND TOUGHENED REGION

(71) Applicant: GENERAL ELECTRIC COMPANY, Schenectady, NY (US)

(72) Inventors: Arthur William Sibbach, Boxford, MA (US); Nicholas Joseph Kray, Mason, OH (US); Gregory Carl Gemeinhardt, Park Hills, KY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/172,723

(22) Filed: Feb. 22, 2023

(65) Prior Publication Data

US 2024/0280026 A1 Aug. 22, 2024

(51) Int. Cl.
*F01D 5/28* (2006.01)

(52) U.S. Cl.
CPC ...................... *F01D 5/28* (2013.01)

(58) Field of Classification Search
CPC ....................................................... F01D 5/28
See application file for complete search history.

(56) References Cited

U.S. PATENT DOCUMENTS

| | | | |
|---|---|---|---|
| 5,279,892 A | 1/1994 | Baldwin et al. | |
| 6,979,498 B2 * | 12/2005 | Darolia ................. | C23C 28/341 |
| | | | 428/323 |
| 7,704,596 B2 * | 4/2010 | Merrill ...................... | B32B 5/22 |
| | | | 428/307.3 |
| 7,914,256 B2 | 3/2011 | Xie et al. | |
| 8,017,188 B2 | 9/2011 | Xie et al. | |
| 8,105,042 B2 | 1/2012 | Parkin et al. | |
| 8,419,374 B2 | 4/2013 | Huth et al. | |
| 8,696,319 B2 | 4/2014 | Naik | |
| 9,121,296 B2 * | 9/2015 | McCaffrey ........... | B23K 20/129 |
| 10,138,738 B2 * | 11/2018 | Obuchi ................. | F04D 29/542 |
| 10,174,625 B2 * | 1/2019 | Benson ..................... | F02C 7/05 |
| 10,329,918 B2 | 6/2019 | Slavens et al. | |
| 10,487,843 B2 | 11/2019 | Drozdenko et al. | |
| 10,794,193 B2 | 10/2020 | Kupratis et al. | |
| 10,858,725 B2 * | 12/2020 | Li ......................... | F01D 25/005 |
| 11,123,957 B2 * | 9/2021 | Patnaik .................. | B32B 15/20 |
| 11,187,084 B2 | 11/2021 | Backhouse et al. | |
| 2009/0191381 A1 * | 7/2009 | Wallis ................... | F04D 29/388 |
| | | | 428/156 |
| 2011/0052405 A1 * | 3/2011 | Parkin ..................... | F01D 5/147 |
| | | | 264/299 |
| 2016/0032939 A1 * | 2/2016 | Anderson ............. | F04D 29/324 |
| | | | 156/60 |
| 2021/0388726 A1 * | 12/2021 | Churcher .............. | F04D 29/023 |

FOREIGN PATENT DOCUMENTS

FR 3094253 A1 10/2020

* cited by examiner

*Primary Examiner* — Jesse S Bogue
(74) *Attorney, Agent, or Firm* — McGarry Bair PC

(57) ABSTRACT

A turbine engine comprising a compressor section, combustor section, and turbine section in serial flow arrangement, and defining an engine longitudinal axis. The turbine engine includes an airfoil with an outer wall having a pressure side and a suction side, extending between a root and a tip in a span-wise direction, and extending between a leading edge and a trailing edge in a chord-wise direction. The airfoil includes a woven core, a first bonding layer including a toughened region, and a laminate skin provided exterior of the first bonding layer and bonded to the woven core by the first bonding layer.

18 Claims, 8 Drawing Sheets

TURBINE ENGINE WITH A BLADE HAVING WOVEN CORE AND TOUGHENED REGION

TECHNICAL FIELD

The present disclosure relates generally to a gas turbine engine, and more specifically to component for the gas turbine engine having a woven core and including a toughened region.

BACKGROUND

A turbine engine typically includes an engine core with a compressor section, a combustor section, and a turbine section in serial flow arrangement. In a turbofan configuration, a fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Forming engine components is commonly achieved by casting. Casting is a common manufacturing technique for forming various components of a gas turbine aviation engine. Casting a component involves a mold having a void in the form of a negative of the desired component shape, filling the void with a flowable material, letting the material harden, and removing the mold.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
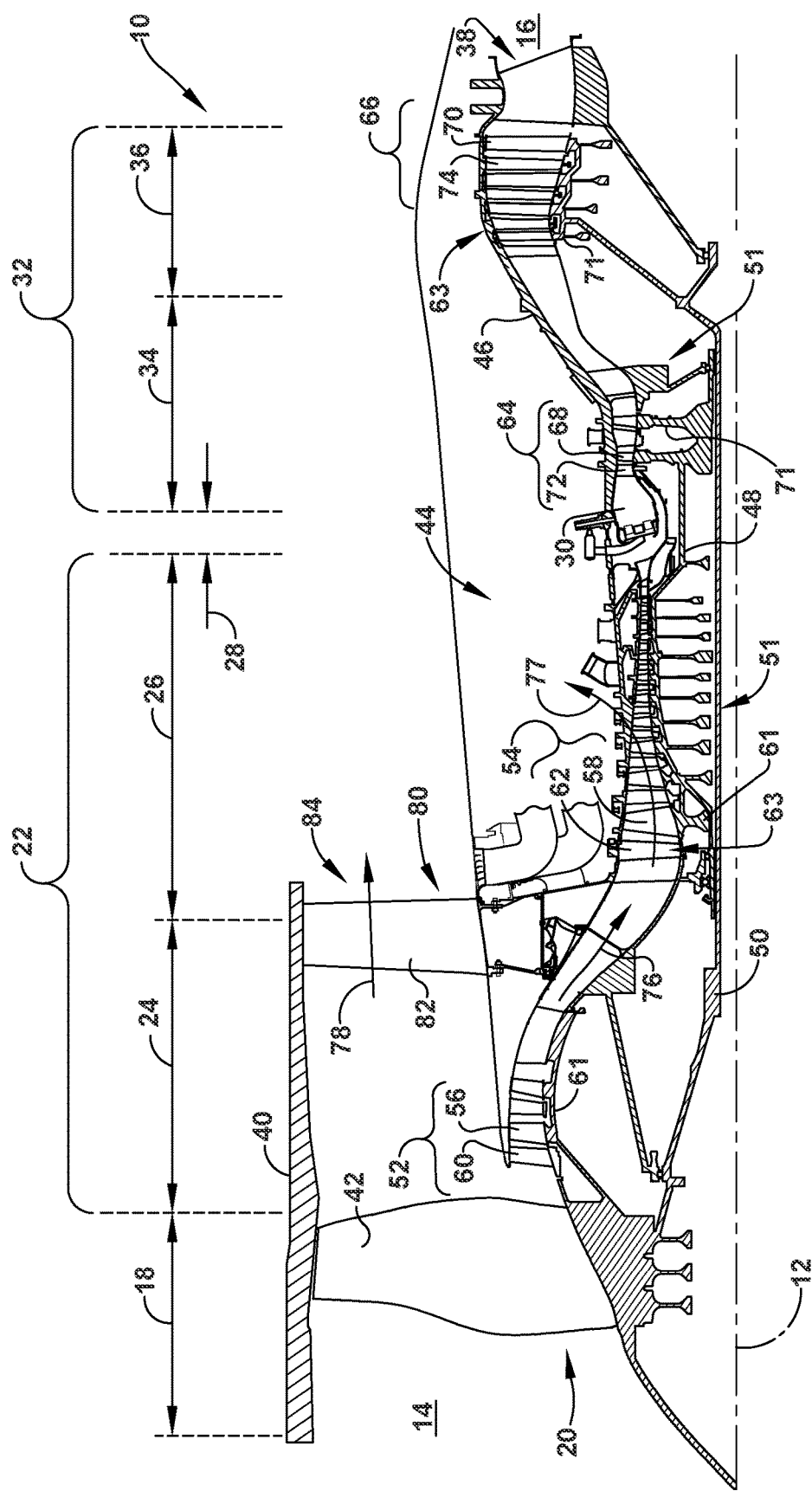
FIG. 1 is a schematic cross-sectional view of a turbine engine in accordance with an exemplary embodiment of the present disclosure.

Aspects of the disclosure herein are directed to a manufactured core used for an engine component, such as an airfoil. The core includes a woven core, and can include additional woven layers forming the engine component. The woven core is used to create an engine component for a turbine engine. Such an engine component can be an airfoil, for example. It should be understood, however, that the disclosure applies to other engine components of the turbine engine, not just an airfoil, such as a combustor liner or disk in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "mechanical property" refers to an inherent property of the element, such as a stiffness, hardness, elasticity, shear strength, fracture toughness, or tensile strength.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining the modulus of elasticity (Young's modulus) under tension or compression, and may relate to an elasticity for a particular material or structure made of such material, such as the engine components described herein. The elasticity can represent the stress per unit area relative to the local strain or proportional deformation thereof.

The term "composite," as used herein is, is indicative of a component having two or more materials A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The inventors' practice has proceeded in the foregoing manner of designing a core used in the manufacture of a component such as an airfoil, designing the airfoil to have improved stiffness transition between the core and an exterior skin, decreased weight, identifying whether or not the component was manufactured as designed and satisfies component objectives, and modifying the engine component when new geometric characteristics of the engine component cannot be manufactured or does not satisfy component objectives. This process is repeated during the design of several different types of components, such as those shown in FIG. 1.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low-pressure (LP) compressor 24 and a high-pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which is coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP and LP spools 48, 50 are rotatable about the engine centerline 12 and couple to a plurality of rotatable elements, which collectively defines a rotor 51.

The LP compressor 24 and the HP compressor 26, respectively, include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The compressor blades 56, 58 may be part of a disk, rather than being mounted to a disk. The static compressor vanes 60, 62 for a stage of the compressor are mounted to the core casing 46 in a circumferential arrangement.

The HP turbine 34 and the LP turbine 36, respectively, include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the turbine are mounted to the core casing 46 in a circumferential arrangement.

Complimentary to the rotor portion, the stationary portions of the turbine engine 10, such as the static vanes 60, 62, 72, 74 among the compressor and turbine sections 22, 32 are also referred to individually or collectively as a stator 63. As such, the stator 63 refers to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from the combustion gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 is drawn from the compressor section 22 as bleed air 77. The bleed air 77 is drawn from the pressurized airflow 76 and provided to engine components requiring cooling. The temperature of pressurized airflow 76 entering and exiting the combustor 30 is significantly increased. As such, cooling provided by the bleed air 77 is supplied to downstream turbine components (e.g., a turbine blade 68) subjected to the heightened temperature environments.

A remaining portion of the airflow exiting the fan section 18, a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 bypasses the engine core 44 and is used for cooling of portions, especially hot portions, of the turbine engine 10, and/or used to cool or power other aspects of the aircraft. In the context of the turbine engine 10, the hot portions refer to a variety of portions of the turbine engine 10 downstream of the combustion section 28 (e.g., the turbine section 32). Other sources of cooling fluid include, but are not limited to, fluid discharged from the LP compressor 24 or the HP compressor 26.

Figure 2:
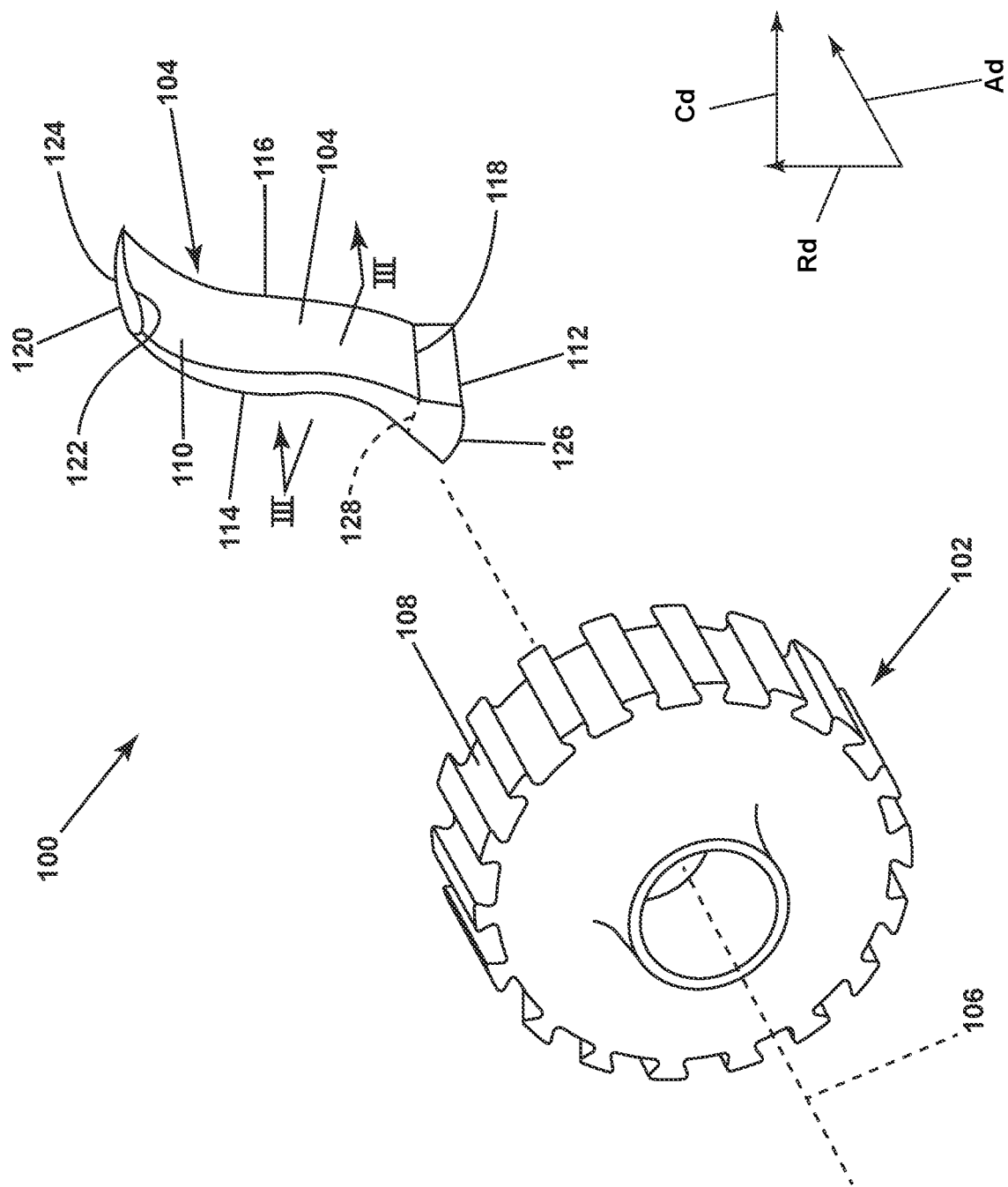
FIG. 2 is a schematic perspective view of a composite airfoil assembly suitable for use within the turbine engine of FIG. 1, the composite airfoil assembly including an airfoil and a disk assembly, and the airfoil including an airfoil portion and a dovetail portion, in accordance with an exemplary embodiment of the present disclosure.

FIG. 2 is a schematic perspective view of a composite airfoil assembly 100 including an airfoil 104, and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10 of FIG. 1. The composite airfoil assembly 100 can be rotating or non-rotating such that the composite airfoil assembly 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 100 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106.

The airfoil 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 is radially spaced inwardly from the second end 128, with respect to the rotational axis 106. The first end 126 defines a radial inner surface of the dovetail portion 112. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

The airfoil 104 is coupled to the disk assembly 102 by inserting at least a portion of the dovetail portion 112 into a respective slot of the plurality of slots 108. The airfoil 104 is held in place by frictional contact with the slot 108 or can be coupled to the slot 108 via any suitable coupling method such as, but not limited to, welding, adhesion, fastening, or the like. While only a single airfoil 104 is illustrated, it will be appreciated that there can be any number of one or more airfoils 104 coupled to the disk assembly 102. As a non-limiting example, there can be a plurality of airfoils 104 corresponding to a total number of slots of the plurality of slots 108.

For the sake of reference, a set of relative reference directions, along with a coordinate system can be applied to the composite airfoil assembly 100. An axial direction (Ad), can extend from forward to aft and is shown extending at least partially into the page. The axial direction (Ad) and can be arranged parallel to the rotational axis 106. A radial direction (Rd) extends perpendicular to the axial direction (Ad), and can extend perpendicular to the engine centerline 12 (FIG. 1). A circumferential direction (Cd) can be defined perpendicular to the radial direction (Rd), and can be defined along the circumference of the turbine engine 10 (FIG. 1) relative to the engine centerline 12.

Figure 3:
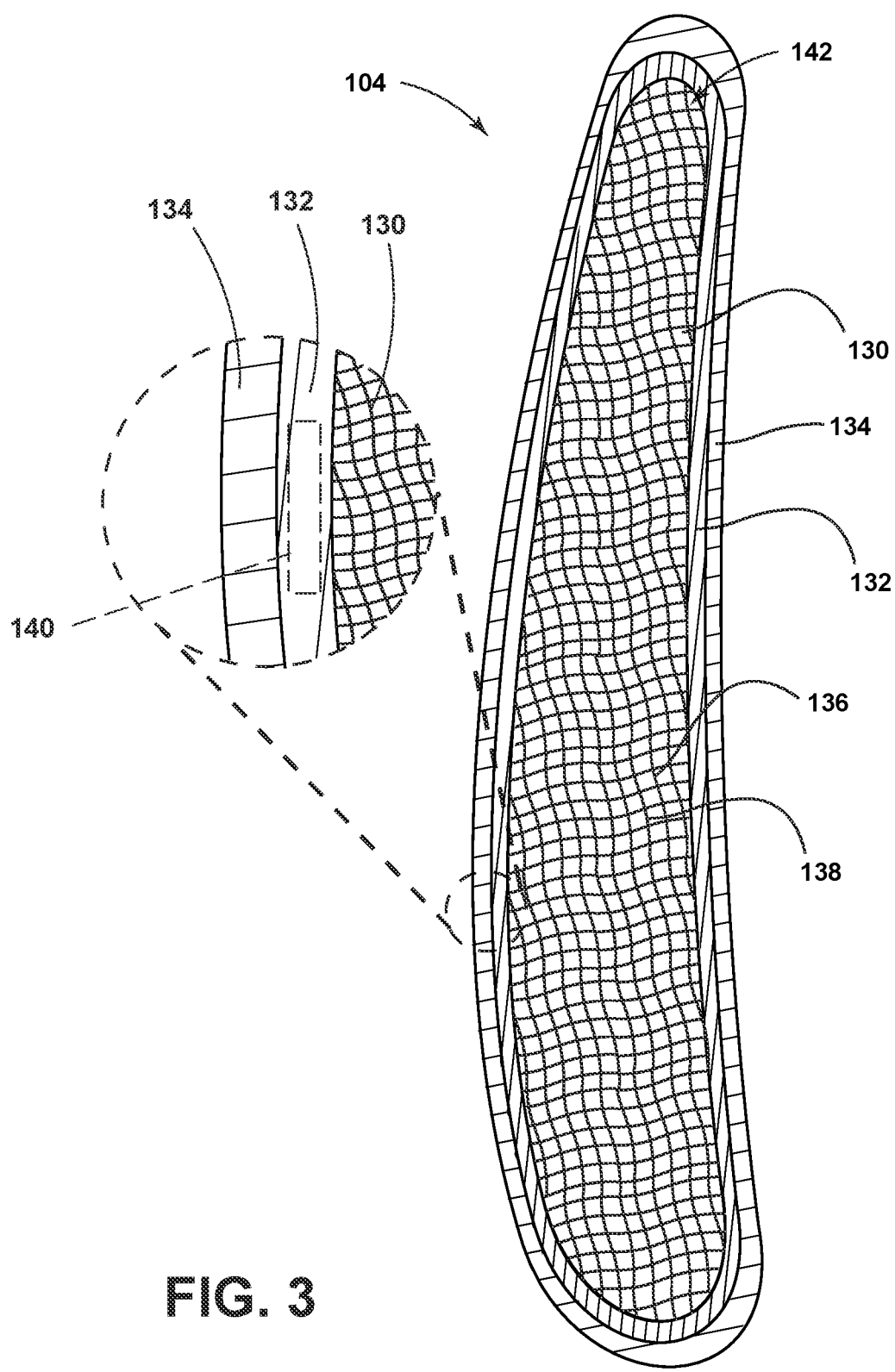
FIG. 3 is a schematic cross-sectional view taken along line III-III of FIG. 2 showing an interior of the composite airfoil assembly, including a bonding layer with a toughened region, in accordance with an exemplary embodiment of the present disclosure.

FIG. 3 is a cross-sectional view of the airfoil 104, and more particularly the airfoil portion 110, of FIG. 2, taken along section III-III, better illustrating the interior 142 of the airfoil 104. The airfoil includes a woven core 130, a bonding layer 132 provided over the woven core 130, and a laminate skin 134 provided over the bonding layer 132.

The woven core 130 can be dry, with no additional materials, or alternatively, be impregnated with a resin and cured in one non-limiting example. The woven core 130 is made of a woven structure. Such a woven structure can be a three-dimensional woven structure. More specifically, the woven structure can be woven in a combination of the axial direction Ad, the radial direction Rd, and the circumferential direction Cd (FIG. 2) to define a weave pattern. It should be appreciated that the weave pattern can be formed and defined separate from the turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 136 and weft fibers 138 which can be woven in three directions to form a three-dimensional structure for the woven core 130. The three directions for the warp fibers 136 and weft fibers 138 can be defined along or angled relative to the axial direction Ad, the radial direction Rd, and the circumferential direction Cd. In one non-limiting example, a Jacquard loom or 3D weaving machine can be used to create complex three-dimensional woven structures, which can include interweaving one or more composites to form the woven core 130. The woven core 130 can be comprised of composite materials, such as carbon or carbon fibers, glass or glass fibers, nylon, rayon, or other aramid fibers, while other materials such as nickel, titanium, or ceramic composites are contemplated in non-limiting examples.

It is further contemplated that the woven core 130 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 130, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials.

The bonding layer 132 provides for bonding the laminate skin 134 to the woven core 130. The bonding layer 132 can be a resin-rich layer or a resin veil, for example, or can be an adhesive. The bonding layer 132 can have a first toughness, where the first toughness is defined by an inherent mechanical property of the bonding layer 132, such as a strength, stiffness, hardness, fracture strength, shear strength, tensile strength, or elasticity, in non-limiting examples.

The bonding layer 132 includes a toughened region 140. The toughened region 140 can be defined by the incorporation of one or more toughening materials, or a toughening agent, onto, into, or within the bonding layer 132 to locally strengthen or toughen the mechanical property of the bonding layer 132 to define a second toughness. That is, the bonding layer 132 can include the first toughness, and the toughened region 140 can include a different second toughness, defined by a common mechanical property among the bonding layer 132 and the bonding layer 132 having the toughened region 140. The incorporated toughening materials can strengthen or toughen the bonding layer 132, such as increasing strength, stiffness, hardness, fracture strength, shear strength, or tensile strength, or decrease elasticity within the toughened region 140. In this way, the toughened region 140 can be 'stronger' or 'tougher' than a nearby or adjacent region of the bonding layer 132. Stronger or tougher can be used to mean having a relatively greater strength, stiffness, hardness, fracture strength, shear strength, tensile strength, or having a relatively lesser elasticity. Such strengths, stiffnesses, hardnesses, or elasticities defined by the toughened region 140 are adapted to operate under a greater amount of local stress than that of adjacent or nearby areas of the airfoil 104. In one non-limiting example, it is contemplated that the first toughness can be defined as an average of the measured inherent mechanical property across the toughened region 140. In another non-limiting example, the first roughness can be defined as a maximum or greatest value of the mechanical property for the toughened region 140.

In non-limiting examples, the toughening materials defining the toughened region 140 can include rubber particles, thermoplastics, or other toughened epoxies or resins different than that defining the bonding layer 132. Alternative non-limiting examples for the toughened region 140 include polymers, nano-fibers such as carbon nano-fibers, nanoparticles such as clay or rubber, or combinations thereof. Polymers, for example, can be a powder or liquid polymer, which can be sprayed as a spray onto the bonding layer 132, or the woven core 130 prior to application of the bonding layer 132. Such a spray can be discretely applied to desired portions of the airfoil 100. In this way, the toughened region 140 can be provided as a spray onto the exterior of the bonding layer 132 or the woven core 130. Additionally, it is contemplated that the toughened region 140 can be formed by adding a toughening material to an untoughened material or materials, including but not limited to a resin, a gel, a powder, or a liquid to form the toughened region 140.

In another non-limiting example, the toughening material can be provided throughout the entirety of the bonding layer 132. The first toughness can be defined by the mechanical property of the bonding layer 132 as determined without the added toughening material, and the second toughness can be defined by the bonding layer 132 with inclusion of the toughening material. In this way, it should be appreciated that the toughening material added to the bonding layer 132 can define a plurality of toughened regions 140, which may be provided throughout the entirety of the bonding layer 132, or a subsection or portion thereof.

The toughening material provided within one or more toughened regions 140 can have an equal distribution of the toughening materials within the toughened region 140, while an unequal distribution is contemplated. Such an unequal distribution can be used to tailor local areas or discrete portions of the toughened region 140 with more toughening materials to have a relatively greater toughness or strength than other areas or portions of the toughened region having relatively less toughening materials. Furthermore, multiple discrete toughened regions 140 are contemplated, which are separated or otherwise delineated from one another. In another non-limiting example, it is contemplated that the toughening materials account for between 3% and 20% total weight of the bonding layer 132 or toughened region 140, with the untoughened materials accounting for between 80%-97% of the total weight of the bonding layer 132 or the toughened region 140, while greater ranges are within the scope of this disclosure.

The bonding layer 132 mitigates stress between the woven core 130 and the laminate skin 134 while bonding the two together. The toughened region 140 can be provided at areas of the bonding layer 132 where anticipated local stresses are greater than other areas of the bonding layer 132. Such anticipated local stresses can be determined by utilizing modelling, for example.

The laminate skin 134 can be formed as a set of one or more laminate layers or plies, provided around or about the woven core 130. The laminate skin 134 can be pre-impregnated, fiber placed, or dry fiber laminate layers, in non-limiting examples. Such laminate layers forming the laminate skin 134 can be formed by resin transfer molding (RTM), partial RTM, same qualified resin transfer molding (SQRTM), or out-of-autoclave in non-limiting examples. In another non-limiting example, it is contemplated that the laminate skin 134 can be made of the same or different material as the woven core 130 or the bonding layer 132, or that the laminate skin 134 can be woven, including a similar or dissimilar weave pattern as that of the woven core 130.

It is further contemplated that an exterior coating (not shown) can be provided exterior of the laminate skin 134, such as an environmental barrier coating, for example, which can be used to resist oxidization or corrosion, or a paint coating, During operation, fan blades or other airfoils are rotatably driven to move a volume of air or fluid within the turbine engine. Such rotation can result in high operational stresses being imparted to the blades or airfoils, with the particular geometry of the blade resulting in areas of relatively higher local stresses. The bonding layer 132 provides for greater adhesion between the woven core 130 and the laminate skin 134, while utilizing the toughened region 140 can mitigate the higher local stresses where appropriate. Therefore, the blade or airfoil can realize the benefits of using the woven core 130, while providing improved adhesion with the bonding layer 132 and mitigating areas of heightened local stresses with local toughened regions 140.

Figure 4:
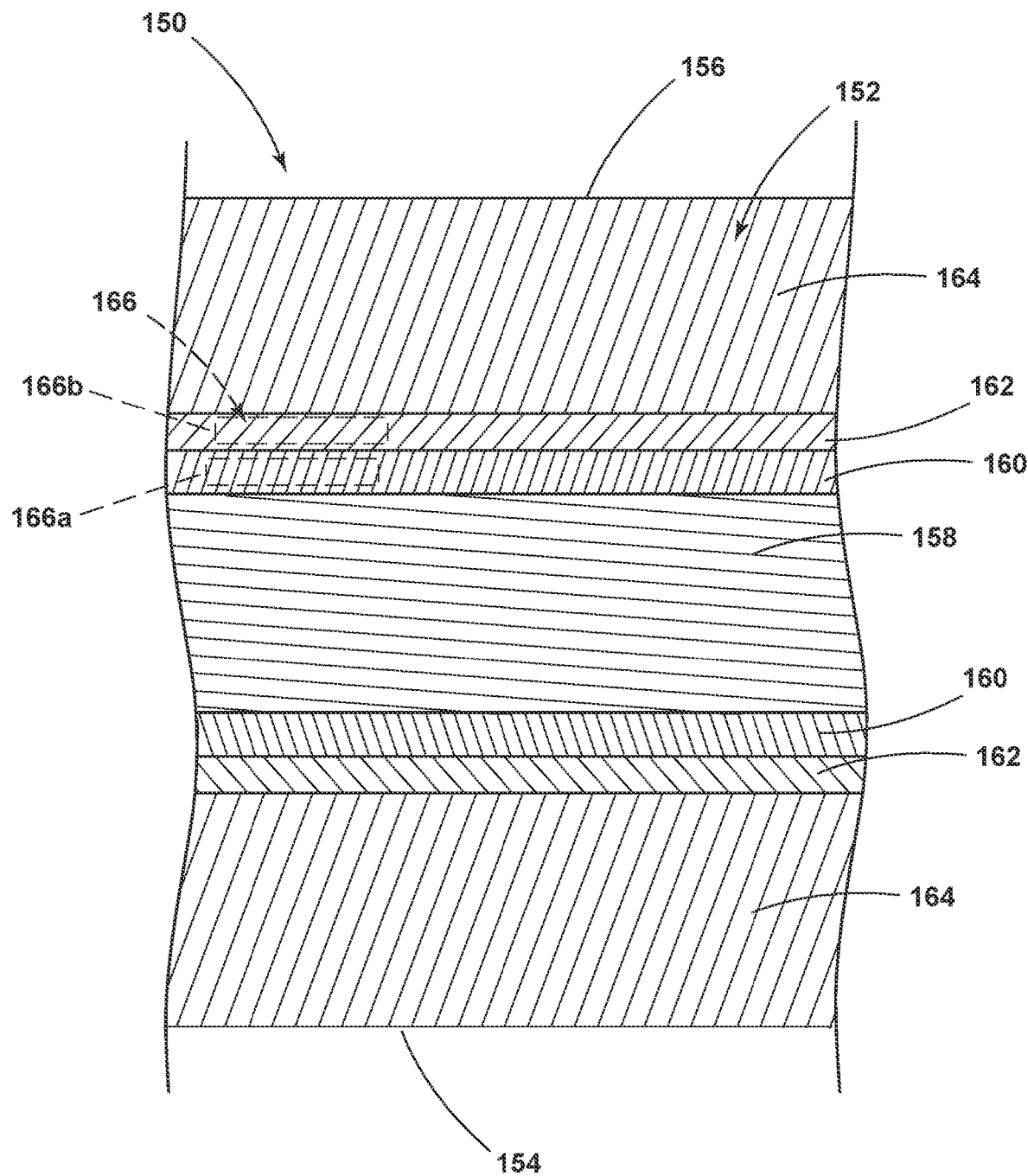
FIG. 4 is a schematic cross section of a portion of an airfoil, having a woven core, and with a first bonding layer and a second bonding layer each including a toughened region, in accordance with an exemplary embodiment of the present disclosure.

FIG. 4 illustrates a section of an alternative airfoil 150 including an outer wall 152 with a pressure side 154 and a suction side 156. The airfoil 150 includes a woven core 158, a first bonding layer 160, a second bonding layer 162, and a laminate skin 164. The laminate skin 164 can form the outer wall 152, while it is contemplated that any elements exterior of the woven core 158 forms the outer wall 152. The first bonding layer 160 is provided on the woven core 158 and the second bonding layer 162 is provided on the first bonding layer 160. The laminate skin 164 is provided on the second bonding layer 162.

The first bonding layer 160 can be a different material or structure than that of the second bonding layer 162. For example, the first bonding layer 160 can be a first adhesive adapted to bond to the woven core 158, while the second bonding layer 162 can be a second adhesive adapted to bond to the laminate skin 164. Furthermore, the first bonding layer 160 and the second bonding layer 162 can be adapted to bond to one another, forming a stronger or tougher bond among the first and second bonding layers 160, 162 as opposed to using a single bonding layer to bond directly to both the woven core 158 and the laminate skin 164. That is, the bond between the first and second bonding layers 160, 162 permits an overall stronger average bond between the woven core 158 and the laminate skin 164 than that of the average bond with only a single bonding layer. This overall stronger average bond is possible because the first bonding layer 160 can be tailored to bond to the woven core 158, and the second bonding layer can be tailored to bond to the laminate skin 164, whereas only a single layer requires a balance among bonding to both the woven core 158 and the laminate skin 164.

Furthermore, it is contemplated that a toughened region 166 can be provided in one or both of the first and second bonding layers 160, 162. As shown a first toughened region 166a is provided in the first bonding layer 160 and a second toughened region 166b is provided in the second bonding layer 162. It should be understood that the first and second toughened regions 166a, 166b can each include a toughening material to locally strengthen the airfoil 150 against local stresses. In one non-limiting example, it is contemplated that only one toughened region 166 is provided, and can be positioned in one of the first or second bonding layers 160, 162. In another non-limiting example, it is contemplated that the toughened region 166 spans both the first and second bonding layers 160, 162.

The airfoil 150 including the first and second bonding layers 160, 162 can improve overall bond between the interior woven core 158 and the laminate skin 164. Additionally, the toughened regions 166 can provide for increased local strength at areas of anticipated increased stress, while being utilized within the first or second bonding layers 160, 162 to increase the overall average bonding strength of the airfoil 150.

Figure 5:
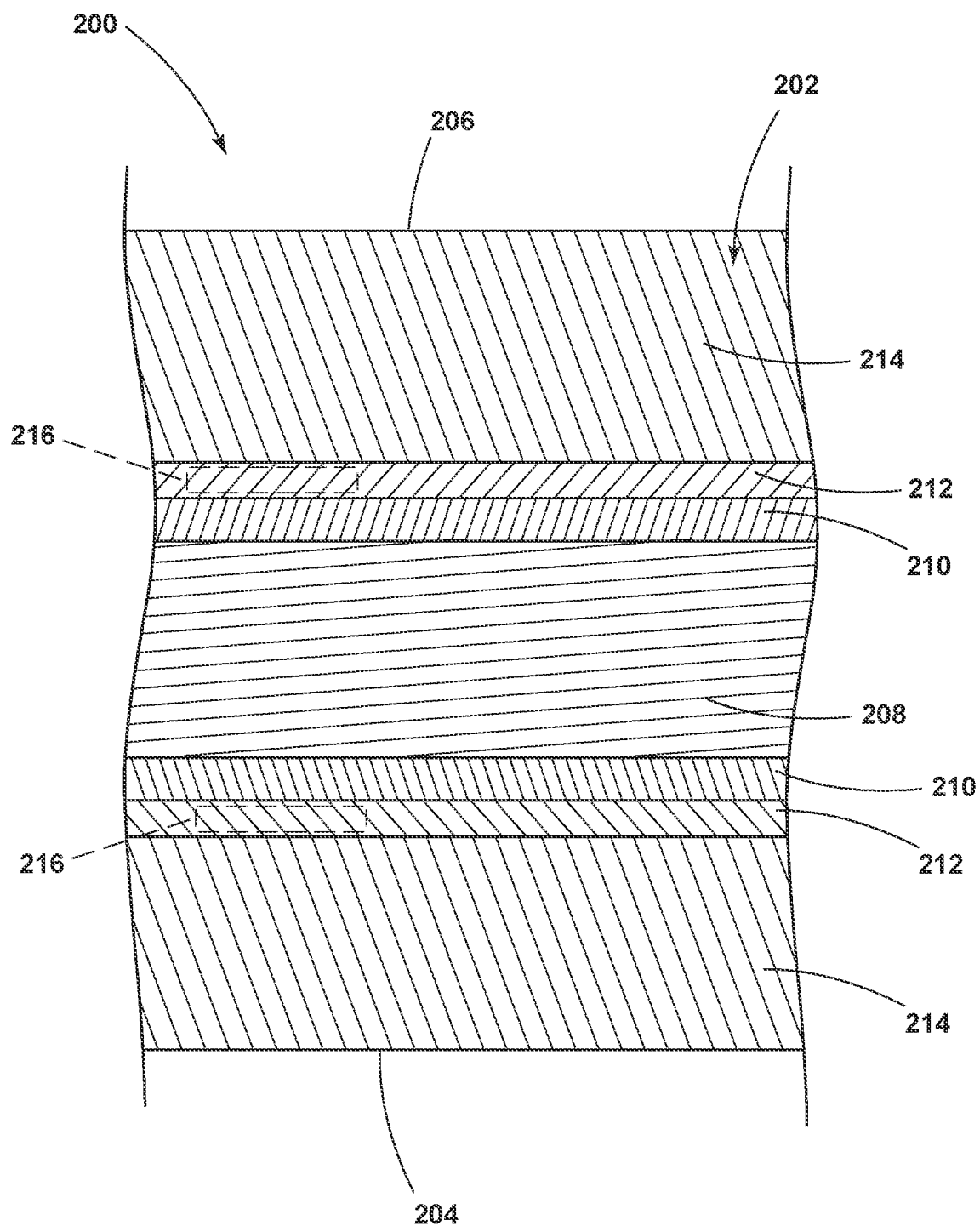
FIG. 5 is a schematic cross section of a portion of an airfoil, having a woven core, and with a toughened bonding layer and an untoughened bonding layer, securing a laminate skin to the woven core, in accordance with an exemplary embodiment of the present disclosure.

FIG. 5 illustrates a section of an alternative airfoil 200 including an outer wall 202 with a pressure side 204 and a suction side 206. The airfoil 200 includes a woven core 208, an untoughened bonding layer 210, a toughened bonding layer 212, and a laminate skin 214. The laminate skin 214 can form the outer wall 202, while it is contemplated that any elements exterior of the woven core 208 forms the outer wall 202.

The untoughened bonding layer 210 can be a resin or adhesive layer adapted to bond to the woven core 208. The untoughened bonding layer 210 is without a toughening material.

The toughened bonding layer 212 can similarly be a resin or adhesive layer, adapted to bond to the laminate skin 214, and including a toughening material within the entirety of the toughened bonding layer 212 as a plurality of toughened regions 216, or one or more toughened regions 216 arranged within a portion of the toughened bonding layer 212. In this way, the toughened bonding layer 212 can include a toughening material provided within the entirety of the toughened bonding layer 212 as a plurality of toughened regions 216, or can be discretely provided to areas of anticipated increased stress as a set of one or more discrete toughened regions 216. Furthermore, the toughened bonding layer 212 can be adapted to bond to the untoughened bonding layer 210, such that the overall bond is improved, as opposed to an assembly without one of the untoughened or toughened bonding layers 210, 212.

Figure 6:
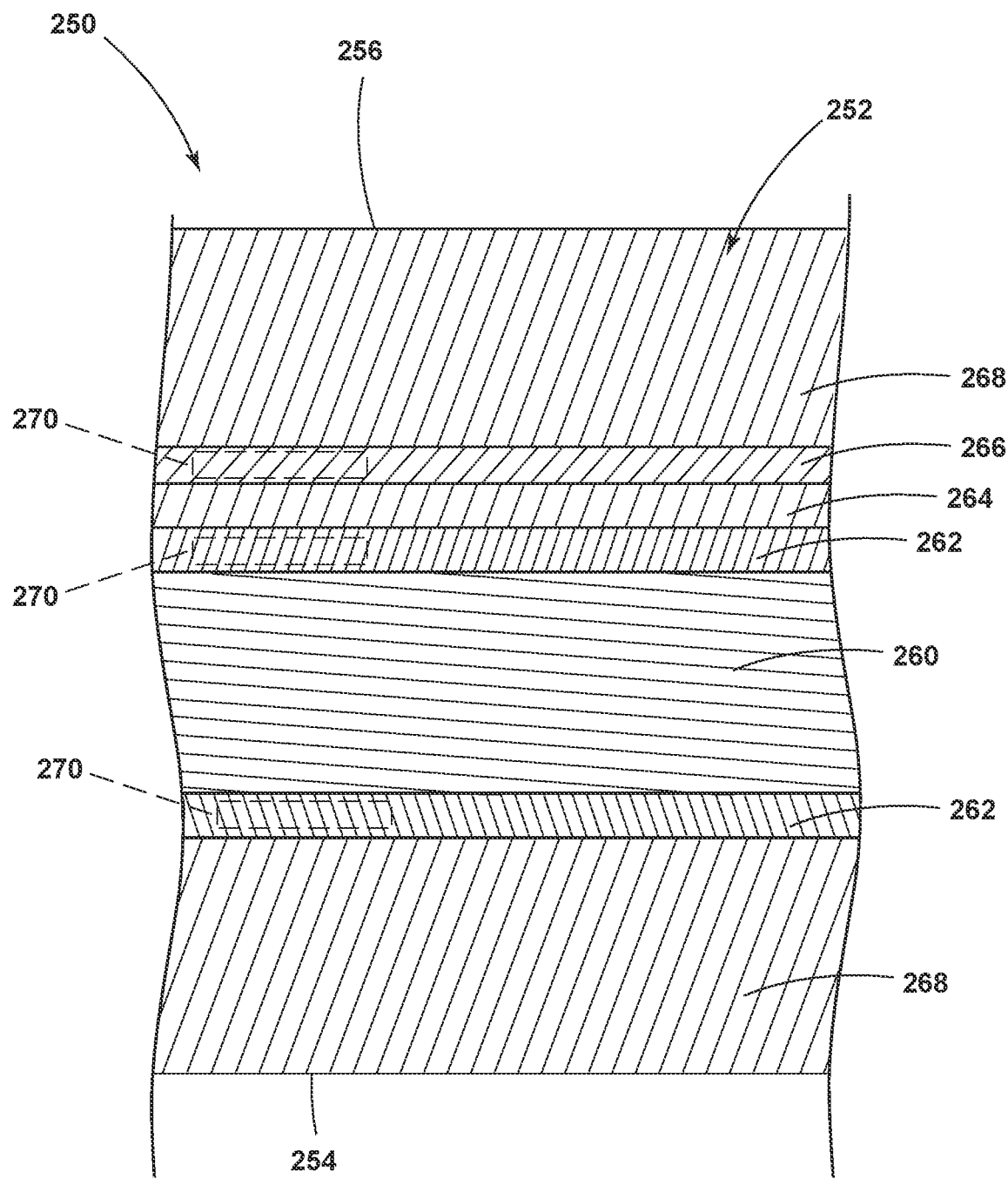
FIG. 6 is a schematic cross section of a portion of an airfoil, having a woven core, a first bonding layer, a laminate layer, a second bonding layer, and an exterior laminate skin, having an asymmetric arrangement, in accordance with an exemplary embodiment of the present disclosure.

FIG. 6 shows a view of a section of an alternative airfoil 250 including an outer wall 252 with a pressure side 254 and a suction side 256. The airfoil 250 includes a woven core 260 and a first bonding layer 262. The suction side 256 further includes a laminate layer 264 provided on the first bonding layer 262, and a second bonding layer 266 provided on the laminate layer 264. An exterior laminate skin 268 is provided on the second bonding layer 266 on the suction side 256. The exterior laminate skin 268 can form the outer wall 252, while it is contemplated that any elements exterior of the woven core 260 forms the outer wall 252. The exterior laminate skin 268 provided on the first bonding layer 262 on the pressure side 254. In this way, it should be understood that the pressure side 254 and the suction side 256 are different, or non-symmetric. In this way, a manufacturer is permitted to tailor the pressure or suction sides 254, 256 to anticipated engine stresses or forces, where one side may need greater strength, while the remaining side may need relatively lesser strength.

The first bonding layer 262 can be different than that of the second bonding layer 266, or can be similar. The first bonding layer 262 can be tailored to bond to the woven core 260, facilitating bonding of the woven core 260 to the laminate layer 264 on the suction side 256 and to the exterior laminate skin 268 on the pressure side 254.

The laminate layer 264 can be a single ply, or can be discretely applied along only a portion of the first bonding layer 262. In alternative example, it is contemplated that the laminate layer 264 be provided on the pressure side 254, as opposed to the suction side 256 as shown.

It is contemplated that the first bonding layer 262 or the second bonding layer 266 can be made or similar materials, or can be different. For example, the first bonding layer 262 can be adapted to bond to the woven core 260, while the second bonding layer 266 can be adapted to bond to the exterior laminate skin 268.

A toughened region 270 can be provided within one or more of the first bonding layer 262 or the second bonding layer 266, and can be provided on either of the pressure side 254 or the suction side 256, or both. As shown, the toughened region 270 is provided within each of the first and second bonding layer 262, 266 on both the pressure and suction sides 254, 256, although it is contemplated that only one or more of the first or second bonding layers 262, 266 be provided on either or both of the pressure side or the suction side 254, 256. It should be appreciated that the toughened region 270 can be provided within an entirety of one or both of the first and second bonding layers 262, 266, or can be discretely arranged as a set of one or more toughened regions 270 therein. The toughened regions 270 can be used to discretely toughen a region, portion, or area of the airfoil 250, while still facilitating bonding adjacent layers with the first and second bonding layers 262, 266.

Utilizing the first and second bonding layers 262, 266 on one of the pressure side 254 or the suction side 256 can provide for improving bonding locally, or on one side of the airfoil 250 as may be desirable, thereby minimizing size and weight of the component. Similarly, providing the toughened region 270 discretely within the first and second bonding layers 262, 266 can provide for discretely toughening the airfoil where desirable or necessary, without adding excessive additional weight or material.

Figure 7:
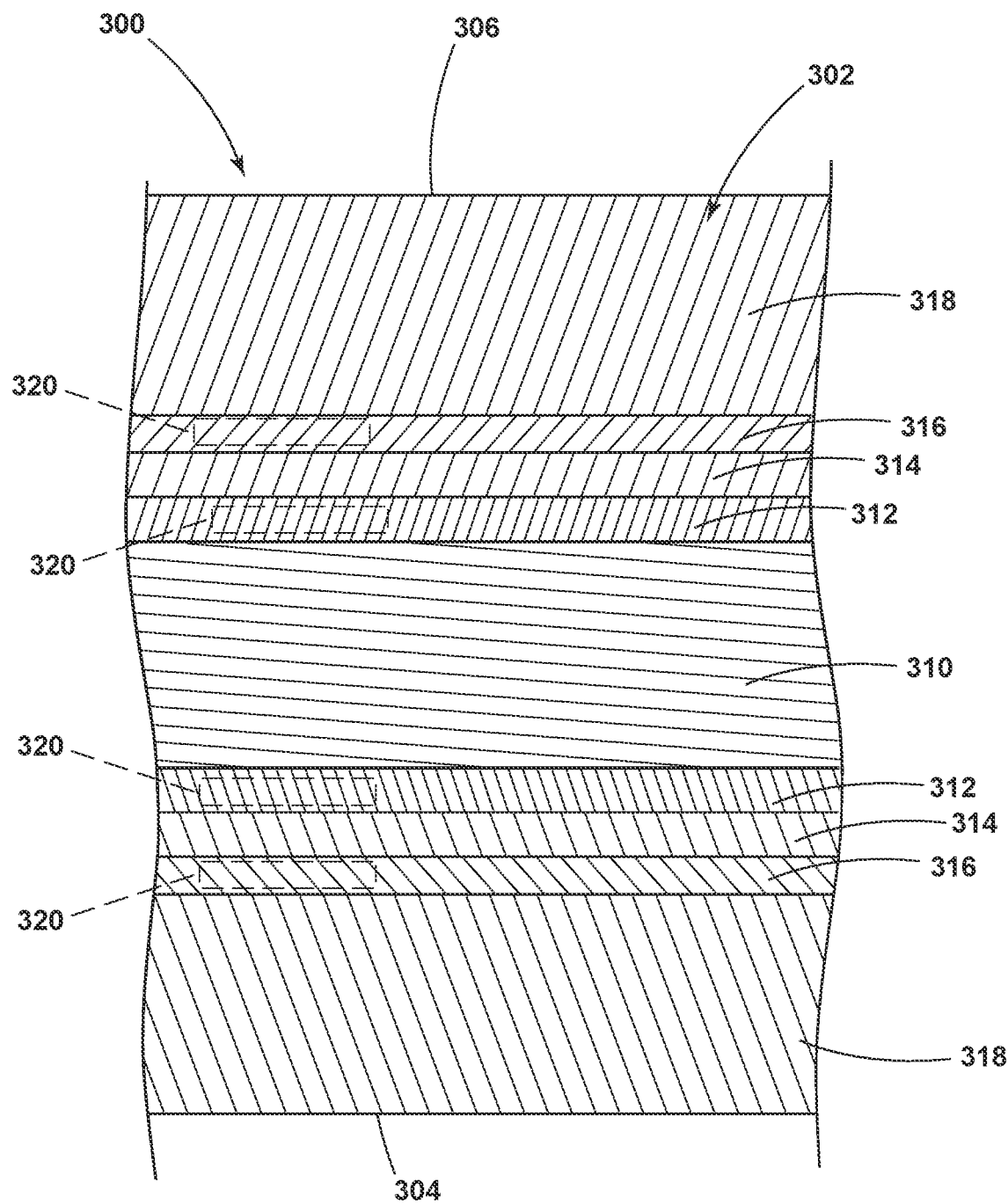
FIG. 7 is a schematic cross section of a portion of an airfoil, having a woven core, a first bonding layer, a laminate layer, a second bonding layer, and an exterior laminate skin, having a symmetric arrangement, in accordance with an exemplary embodiment of the present disclosure.

FIG. 7 illustrates a section of an alternative airfoil 300 including an outer wall 302 with a pressure side 304 and a suction side 306. The airfoil 300 includes a woven core 310, with a first bonding layer 312, a laminate layer 314, a second bonding layer 316, and a laminate skin 318 on both of the pressure side and the suction side 306. The laminate skin 318 can form the outer wall 302, while it is contemplated that any elements exterior of the woven core 310 forms the outer wall 302. A toughened region 320 can be provided within one or both of the first bonding layer 312 and the second bonding layer 316, and can be provided on one or both of the pressure side 304 and the suction side 306. It should be appreciated that the toughened region 320 can be provided within an entirety of one or both of the first or second bonding layers 312, 316, formed as one or more pluralities of toughened regions 320. Additionally, it is contemplated that the toughened region 320 can be discretely arranged as one or more toughened regions 320 within either or both of the first and second bonding layers 312, 316. Similarly, it is contemplated that a toughened region can be provided on the laminate layer 314, such as via spraying, and then formed as part of a bonding layer formed on the laminate layer 314.

Utilizing the first and second bonding layers 312, 316 can provide for improving bonding locally, or on one side of the airfoil 300 as may be desirable, thereby minimizing size and weight of the component. Similarly, providing the toughened regions 320 discretely within the first and second bonding layers 312, 316 can provide for discretely toughening the airfoil 300 where desirable or necessary, without adding excessive additional weight or material.

Figure 8:
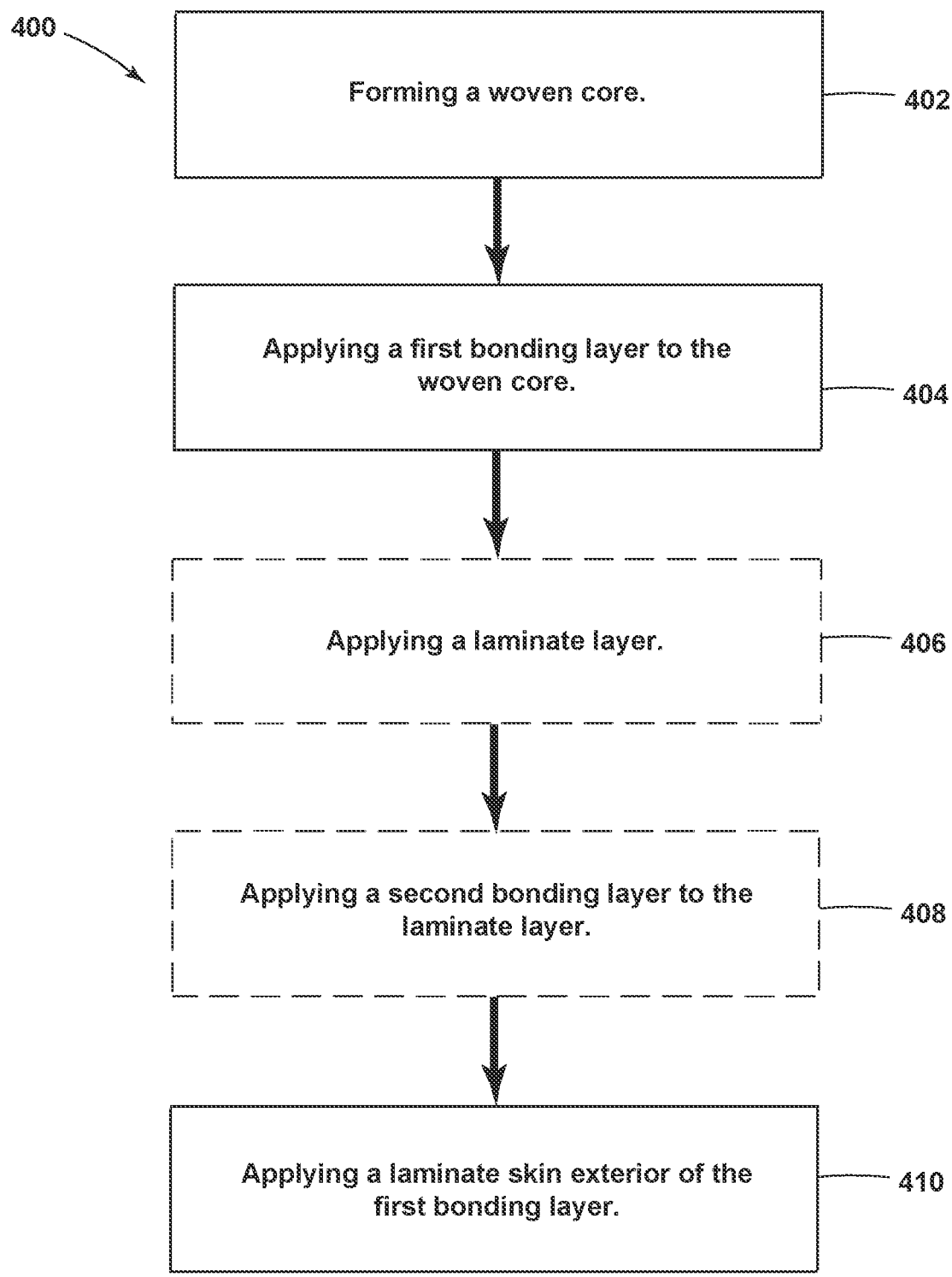
FIG. 8 is a flow chart illustrating a method of forming an engine component, in accordance with an exemplary embodiment of the present disclosure.

FIG. 8 illustrates a flow chart showing a method 400 of forming an engine component, such as a fan blade or airfoil as described herein. The method 400 can include, at 402, forming a woven core. The woven core can include a three-dimensional weave pattern, for example, and can be formed by a Jacquard loom or 3D weaving machine, for example. At 404, a first bonding layer can be applied to the woven core, such as the first bonding layers described herein. The first bonding layer can include one or more toughened regions, or can include a toughened region provided among and within the entirety of the first bonding layer.

At 406, optionally, a laminate layer can be applied to the exterior of the first bonding layer. The laminate layer can be formed as a single ply, or can be formed as a set of one or more laminate layers. At 408, optionally, a second bonding layer can be applied exterior of the laminate layer. It is contemplated that the second bonding layer can be provided on the first bonding layer, without the intermediate laminate layer discussed at 406. Furthermore, it is contemplated that the second bonding layer can include one or more second toughened regions, or can include a plurality of toughened regions provided within the entirety of the second bonding layer.

At 410, a laminate skin can be applied to the exterior of the first bonding layer. Where the laminate layer or the second bonding layer are utilized at 406 or 408, respectively, the laminate skin can be applied exterior to the laminate layer or the second bonding layer.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine comprising: a compressor section, combustor section, and turbine section in serial flow arrangement, and defining an engine centerline; and an airfoil, including an outer wall having a pressure side and a suction side, the outer wall extending between a root and a tip in a span-wise direction, and the outer wall extending between a leading edge and a trailing edge in a chord-wise direction, the airfoil rotatable about the engine centerline, the airfoil comprising: a woven core, a first bonding layer located exteriorly of the woven core, the first bonding layer having a mechanical property defining a first toughness, and the first bonding layer having a toughened region, with the toughened region having a mechanical property defining a second toughness that is tougher than the first toughness, and a laminate skin located exteriorly of the first bonding layer, and bonded to the woven core by the first bonding layer.

The turbine engine of any preceding clause wherein the toughened region includes a toughening material.

The turbine engine of any preceding clause wherein the toughening material includes rubber particles, thermoplastics, nano fibers, or nano particles.

The turbine engine of any preceding clause wherein the toughening material includes a polymer.

The turbine engine of any preceding clause wherein the toughening material comprises between 3% and 20% of the total weight of the first bonding layer.

The turbine engine of any preceding clause wherein the first bonding layer is located on both of the pressure side and the suction side.

The turbine engine of any preceding clause further comprising a second bonding layer located exteriorly of the first bonding layer.

The turbine engine of any preceding clause wherein the second bonding layer includes a second toughened region including a second toughening material.

The turbine engine of any preceding clause wherein the second toughening material is different than the first toughened material.

The turbine engine of any preceding clause wherein the second toughening material is located only on the suction side.

The turbine engine of any preceding clause wherein the second bonding layer is located interiorly of the laminate skin.

The turbine engine of any preceding clause further comprising a laminate layer located between the first bonding layer and the second bonding layer.

The turbine engine of any preceding clause wherein the laminate layer is formed as a single laminate ply.

The turbine engine of any preceding clause wherein the first bonding layer is adapted to bond to the woven core and the second bonding layer is adapted to bond to the laminate skin.

The turbine engine of any preceding clause wherein the mechanical property is one of stiffness, hardness, elasticity, shear strength, fracture toughness, or tensile strength.

The turbine engine of any preceding clause wherein the airfoil further comprises a laminate layer provided on the first bonding layer.

The turbine engine of any preceding clause wherein the airfoil further comprises a second bonding layer located exteriorly of the laminate layer.

The turbine engine of any preceding clause wherein the pressure side and the suction side of the airfoil are symmetric.

The turbine engine of any preceding clause wherein the pressure side and the suction side of the airfoil are asymmetric.

The turbine engine of any preceding clause wherein the woven core comprises at least one of carbon or carbon fibers, glass or glass fibers, nylon, rayon, or aramid fibers.

The turbine engine of any preceding clause wherein the woven core comprises at least one of nickel, titanium, or ceramic.

The turbine engine of any preceding clause wherein the woven core is formed as a braided core.

The turbine engine of any preceding clause wherein the first bonding layer is an adhesive, a resin rich compliant layer, or a resin veil.

The turbine engine of any preceding clause wherein the laminate layer is formed as a single laminate ply.

The turbine engine of any preceding clause wherein the laminate layer is formed as a set of laminate plies.

The turbine engine of any preceding clause wherein the laminate skin is formed as a set of laminate plies.

The turbine engine of any preceding clause wherein the laminate skin is one of pre-impregnated, fiber placed, or dry fiber.

The turbine engine of any preceding clause wherein the laminate skin is formed by one of resin transfer molding, partial resin transfer molding, same qualified resin transfer molding, or out-of-autoclave.

The turbine engine of any preceding clause wherein the mechanical property for the first bonding layer is one of a strength, stiffness, hardness, fracture strength, shear strength, tensile strength, or elasticity.

The turbine engine of any preceding clause wherein the mechanical property for the toughened region is one of a strength, stiffness, hardness, fracture strength, shear strength, tensile strength, or elasticity.

The turbine engine of any preceding clause wherein the first bonding layer is a resin rich compliant layer or an adhesive layer The turbine engine of any preceding clause wherein the woven core is made from the same material as that of the laminate skin.

The turbine engine of any preceding clause wherein the woven core includes a first weave pattern that is the same as a second weave pattern for the laminate skin.

The turbine engine of any preceding clause wherein the woven core includes a first weave pattern that is different than a second weave pattern for the laminate skin.

A fan blade for a turbine engine comprising: a three-dimensional woven core; a first bonding layer located exteriorly of the three-dimensional woven core; and a laminate skin located exteriorly of the first bonding layer; and a toughened region either located on the first bonding layer or formed into the first bonding layer.

The fan blade of any preceding clause wherein the toughened region is formed into the first bonding layer as rubber particles, thermoplastics, nano fibers, or nano particles.

The fan blade of any preceding clause wherein the toughened region is provided as a spray on an exterior of the first bonding layer.

The fan blade of any preceding clause further comprising a second bonding layer located exteriorly of the first bonding layer.

The fan blade of any preceding clause wherein the second bonding layer includes a second toughened region.

The fan blade of any preceding clause further comprising a laminate layer located between the first bonding layer and the second bonding layer.

A method of forming an airfoil for a turbine engine, the method comprising: forming a three-dimensional woven core; applying a first bonding layer to the three-dimensional woven core wherein the first bonding layer includes a toughened region; and bonding a laminate skin to the three-dimensional woven core with the first bonding layer.

The method of any preceding clause further comprising applying a second bonding layer exterior of the first bonding layer.

The method of any preceding clause further comprising applying at least one laminate ply exterior of the first bonding layer, but prior to applying the second bonding layer.

The method of any preceding clause wherein the second bonding layer further comprises bonding the second bonding layer with a second toughened region.

The method of any preceding clause wherein the second bonding layer is applied only to a suction side of the airfoil.

The method of any preceding clause wherein applying the first bonding layer with the toughened region further includes discretely applying a toughening material to at least a portion of the first bonding layer.

What is claimed is:

1. A turbine engine comprising:
  a compressor section, combustor section, and turbine section in serial flow arrangement, and defining an engine centerline; and
  an airfoil, including an outer wall having a pressure side and a suction side, the outer wall extending between a root and a tip in a span-wise direction, and the outer wall extending between a leading edge and a trailing edge in a chord-wise direction, the airfoil rotatable about the engine centerline, the airfoil comprising:
    a woven core,
    a first bonding layer located exteriorly of the woven core, the first bonding layer having a mechanical property defining a first toughness, and the first bonding layer having a toughened region, with the toughened region having a mechanical property defining a second toughness that is tougher than the first toughness, and
    a laminate skin located exteriorly of the first bonding layer, and bonded to the woven core by the first bonding layer, wherein the woven core is uncured and wherein the toughening region is provided on an exterior of the first bonding layer.

2. The turbine engine of claim 1 wherein the toughened region includes a toughening material.

3. The turbine engine of claim 2 wherein the toughening material includes rubber particles, thermoplastics, nano fibers, or nano particles.

4. The turbine engine of claim 2 wherein the toughening material includes a polymer.

5. The turbine engine of claim 2 wherein the toughening material comprises between 3% and 20% of a total weight of the first bonding layer.

6. The turbine engine of claim 1 wherein the first bonding layer is located on both of the pressure side and the suction side.

7. The turbine engine of claim 1 further comprising a second bonding layer located exteriorly of the first bonding layer.

8. The turbine engine of claim 7 wherein the second bonding layer includes a second toughened region including a second toughening material.

9. The turbine engine of claim 8 wherein the toughened region includes a first toughening material, and wherein the second toughening material is different than the first toughening material.

10. The turbine engine of claim 8 wherein the second toughening material is located only on the suction side.

11. The turbine engine of claim 7 wherein the second bonding layer is located interiorly of the laminate skin.

12. The turbine engine of claim 7 further comprising a laminate layer located between the first bonding layer and the second bonding layer.

13. The turbine engine of claim 12 wherein the laminate layer is formed as a single laminate ply.

14. The turbine engine of claim 7 wherein the first bonding layer is adapted to bond to the woven core and the second bonding layer is adapted to bond to the laminate skin.

15. The turbine engine of claim 1 wherein the mechanical property is one of strength stiffness, hardness, elasticity, shear strength, fracture toughness, or tensile strength.

16. A fan blade for a turbine engine comprising:
  a three-dimensional woven core;
  a first bonding layer located exteriorly of the three-dimensional woven core; and
  a laminate skin located exteriorly of the first bonding layer; and
  a toughened region either located exterior of the first bonding layer or formed into the first bonding layer, wherein the woven core is uncured and wherein the toughened region is provided on an exterior of the first bonding layer.

17. The fan blade of claim 16 wherein the toughened region is formed into the first bonding layer as rubber particles, thermoplastics, nano fibers, or nano particles.

18. The fan blade of claim 16 wherein the toughened region is provided as a spray on the exterior of the first bonding layer.

* * * * *